(12) United States Patent
Rao et al.

(10) Patent No.: US 12,366,696 B1
(45) Date of Patent: Jul. 22, 2025

(54) LIGHT GUIDE DEVICE, LIGHT GUIDE ASSEMBLY AND DISPLAY EQUIPMENT

(71) Applicant: GOERTEK OPTICAL TECHNOLOGY CO., LTD., Shandong (CN)

(72) Inventors: Yi Rao, Weifang (CN); Xin Cheng, Weifang (CN)

(73) Assignee: GOERTEK OPTICAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 19/067,347

(22) Filed: Feb. 28, 2025

(30) Foreign Application Priority Data

Mar. 21, 2024 (CN) .......................... 202410324351.1

(51) Int. Cl.
*G02B 27/00* (2006.01)
*F21V 8/00* (2006.01)
*G02B 1/00* (2006.01)

(52) U.S. Cl.
CPC .......... *G02B 6/0016* (2013.01); *G02B 1/005* (2013.01); *G02B 6/0036* (2013.01); *G02B 6/0065* (2013.01); *G02B 27/0081* (2013.01)

(58) Field of Classification Search
None
See application file for complete search history.

(56) References Cited

U.S. PATENT DOCUMENTS

| | | | | |
|---|---|---|---|---|
| 2017/0097507 | A1* | 4/2017 | Yeoh | G06T 15/005 |
| 2020/0310134 | A1* | 10/2020 | Figueroa | G06T 19/006 |
| 2021/0239984 | A1* | 8/2021 | Popovich | G02B 5/1866 |
| 2024/0134203 | A1* | 4/2024 | Zhao | G02B 27/0172 |

FOREIGN PATENT DOCUMENTS

| | | |
|---|---|---|
| CN | 110764260 A | 2/2020 |
| CN | 113495319 A | 10/2021 |
| CN | 113534328 A | 10/2021 |

(Continued)

OTHER PUBLICATIONS

First Office Action in Corresponding Chinese Application No. 202410324351.1, dated May 6, 2024; 17 pgs.

(Continued)

*Primary Examiner* — Chris H Chu
(74) *Attorney, Agent, or Firm* — HAUPTMAN HAM, LLP

(57) ABSTRACT

Disclosed are a light guide device, a light guide assembly and a display equipment. The light guide device includes a substrate including two opposite surfaces and a sidewall connected between the two surfaces; a coupling-out pupil expansion region provided at the surface; and a reflection layer, wherein a reflection interface of the reflection layer is towards an interior of the substrate and is provided on a diffraction light path of the coupling-out pupil expansion region. The coupling-out pupil expansion region is configured to perform multiple diffraction light splits to coupling-in light coupled into the substrate, and the reflection interface is cooperated with the coupling-out pupil expansion region to reflect the light after multiple diffraction light splits through the coupling-out pupil expansion region and reflect the light through the coupling-out pupil expansion region for coupling-out imaging.

15 Claims, 12 Drawing Sheets

(56) References Cited

FOREIGN PATENT DOCUMENTS

| | | | | |
|---|---|---|---|---|
| CN | 113777707 | A | | 12/2021 |
| CN | 114153073 | A | * | 3/2022 |
| CN | 114217375 | A | * | 3/2022 ......... G02B 27/0172 |
| CN | 114839779 | A | | 8/2022 |
| CN | 115421238 | A | | 12/2022 |
| CN | 218782427 | U | | 3/2023 |
| CN | 116360109 | A | | 6/2023 |
| WO | 2023123920 | A1 | | 7/2023 |
| WO | 2023226143 | A1 | | 11/2023 |

OTHER PUBLICATIONS

Grant Notice in Corresponding Chinese Application No. 202410324351.1, dated May 28, 2024; 5 pgs.

* cited by examiner

LIGHT GUIDE DEVICE, LIGHT GUIDE ASSEMBLY AND DISPLAY EQUIPMENT

CROSS-REFERENCE TO RELATED APPLICATIONS

The present application claims priority to Chinese Patent Application No. 202410324351.1, filed on Mar. 21, 2024, the entire contents of which are incorporated herein by reference.

TECHNICAL FIELD

The present application relates to the technical field of light guide device, and in particular to a light guide device, a light guide assembly and a display equipment.

BACKGROUND

With the development of display technology, people have higher and higher requirements for the visual effects of the display equipment. In recent years, some new display equipment, such as augmented reality (AR) apparatus, have begun to use light guide devices to achieve image transmission and display. The light guide device can couple the light emitted by the external light source into the interior and guide the light to the user's eyes through a specific optical structure, thereby presenting an image.

However, the existing light guide device has the problem of low light transmission efficiency during the light transmission process. For example, part of the light will be absorbed by the sidewall of the light guide device when propagating inside the light guide device, resulting in the loss of light energy. To solve this problem, a light recovery device is provided at the light guide device in the related art, which is configured to recover the light originally absorbed by the sidewall and reflect it to the coupling-out region. Although this can improve the light transmission efficiency of the light guide device, the recovered light will be flipped after reflection. When the flipped light passes through the coupling-out region for coupling-out imaging, it is opposite to the original imaging light direction. This means forming two light transmission paths, which will form a "ghost image", and will affect the imaging effect.

SUMMARY

The purpose of the present application is to provide a light guide device, a light guide assembly and a display equipment.

The present application provides a light guide device, including:

a substrate including two opposite surfaces and a sidewall connected between the two surfaces;

a coupling-out pupil expansion region provided at the surface; and a reflection layer, wherein a reflection interface of the reflection layer is towards an interior of the substrate and is provided on a diffraction light path of the coupling-out pupil expansion region;

wherein the coupling-out pupil expansion region is configured to perform multiple diffraction light splits to coupling-in light coupled into the substrate, and the reflection interface is cooperated with the coupling-out pupil expansion region to reflect the light after multiple diffraction light splits through the coupling-out pupil expansion region and reflect the light through the coupling-out pupil expansion region for coupling-out imaging;

a one-dimensional grating is provided in the coupling-out pupil expansion region;

the light guide device further includes a coupling-out region;

the coupling-in light coupled into the substrate is two half field of view light propagating to the coupling-out pupil expansion region and the coupling-out region respectively; and the coupling-out region is configured to restore the half field of view light, the coupling-out pupil expansion region is configured to flip the propagated half field of view light based on flipping characteristics of the reflection interface to restore to another half field of view light, and the restored two half fields of view light are spliced to form a target image.

In an embodiment, the light guide device further includes a coupling-in region configured to couple light emitted by an external light source into the substrate and propagate to the coupling-out pupil expansion region, wherein the coupling-in region and the coupling-out pupil expansion region are provided on at least one surface of the substrate; and the coupling-in region is provided with a diffraction optical element, and the reflection interface is perpendicular to an interface of the diffraction optical element.

In an embodiment, the coupling-in region is provided with the one-dimensional grating, and a normal direction of the reflection interface is perpendicular to a grating vector direction of the one-dimensional grating.

In an embodiment, the coupling-in region is provided with a two-dimensional grating, a normal direction of the reflection interface is perpendicular to a vector direction of the two-dimensional grating, and the vector direction of the two-dimensional grating is a first-order diffraction direction in response to that the light emitted by the external light source is normally incident.

In an embodiment, the reflection layer is a metal coating.

In an embodiment, a material of the reflection layer is at least one of silver, aluminum and copper.

In an embodiment, a roughness of the reflection interface is less than 10 nm.

In an embodiment, the reflection layer is a diffraction optical element or a super surface device; and the diffraction optical element includes a photonic crystal.

In an embodiment, the coupling-out pupil expansion region and the coupling-out region are respectively provided on both sides of the coupling-in region, and the coupling-in light coupled into the substrate through the coupling-in region is split to both sides and coupled-out to the left and right eyes of a user through the coupling-out pupil expansion region and the coupling-out region respectively.

In an embodiment, the light guide device further includes a pupil expansion region provided on the surface of the substrate, wherein the pupil expansion region is provided on a path of the coupling-in region propagating light to the coupling-out region.

In an embodiment, the coupling-out region is provided with the one-dimensional grating or the two-dimensional grating.

In an embodiment, an edge of the coupling-out pupil expansion region is provided with an avoidance hypotenuse, and a projection of the reflection interface on the surface where the coupling-out pupil expansion region is provided is located at a periphery of the avoidance hypotenuse and is consistent with an inclination direction of the avoidance hypotenuse.

The present application also provides a light guide assembly, including:
an optical machine; and
the light guide device.

In an embodiment, in response to that a projection of a reflection interface on a surface where the coupling-out pupil expansion region is provided forms an angle A with the horizontal field of view or the vertical field of view, the optical machine is configured to rotate around its optical axis to a target angle, and the target angle is 2A.

The present application also provides a display equipment, including: a housing; and the light guide assembly; and the light guide assembly is provided at the housing.

According to the light guide device provided in the embodiment of the present application, the reflection layer is combined with the coupling-out pupil expansion region, and the reflection interface of the reflection layer is located on the diffraction path of the coupling-out pupil expansion region, so that the light propagation path inside the light guide device is optimized. The light coupled into the light guide device is not emitted when encountering the coupling-out pupil expansion region, but is emitted to the reflection interface after being split by the diffraction of the coupling-out pupil expansion region for many times. The light reflected by the reflection interface is re-imaged through the coupling-out pupil expansion region, which forms a light transmission path for imaging, and does not produce "ghost images" compared with the two light transmission paths in the related art. At the same time, the utilization rate of the light is improved, thereby improving the light transmission efficiency of the light guide device. In addition, the light guide device also has the advantages such as the simple structure, the convenient production and the low cost, and has a broad application prospect.

Other features and advantages of the present application will become clear from the detailed description of embodiments of the present application with reference to the accompanying drawings below.

BRIEF DESCRIPTION OF THE DRAWINGS

The accompanying drawings incorporated in the specification and constituting a part of the specification illustrate embodiments of the present application, and are used to explain the principles of the present application together with their description.

DETAILED DESCRIPTION OF THE EMBODIMENTS

Various embodiments of the present application will be described in detail with reference to the accompanying drawings. It should be noted that unless otherwise specifically stated, the relative arrangement of components and steps, numerical expressions and numerical values described in these embodiments do not limit the scope of the present application.

The following description of at least one embodiment is actually only illustrative and is not intended to limit the present application and the application or use thereof.

The techniques, methods and apparatus known to those skilled in the art may not be discussed in detail, but where appropriate, the techniques, methods and apparatus should be considered as part of the specification.

In all examples shown and discussed herein, any specific values should be interpreted as merely exemplary and not as a limitation. Therefore, other examples of embodiments may have different values.

It should be noted that similar numbers and letters represent similar items in the following drawings, so that once an item is defined in one drawing, it does not need to be further discussed in subsequent drawings.

The light guide device, the light guide assembly and the display equipment provided in embodiments of the present application are described in detail below with reference to the accompanying drawings.

Figure 1:
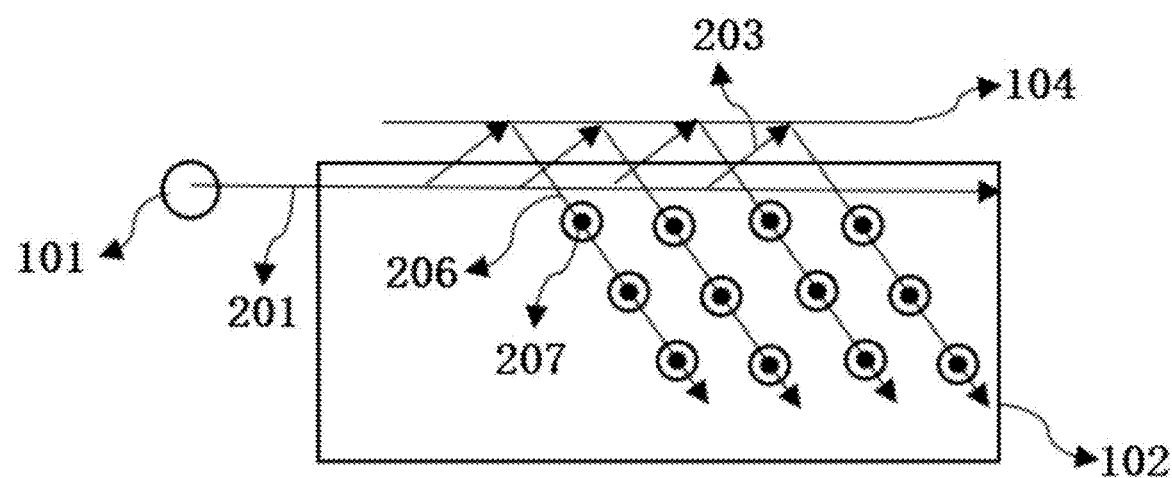
FIG. 1 is a top view of a light guide device according to an embodiment of the present application.
Figure 2:
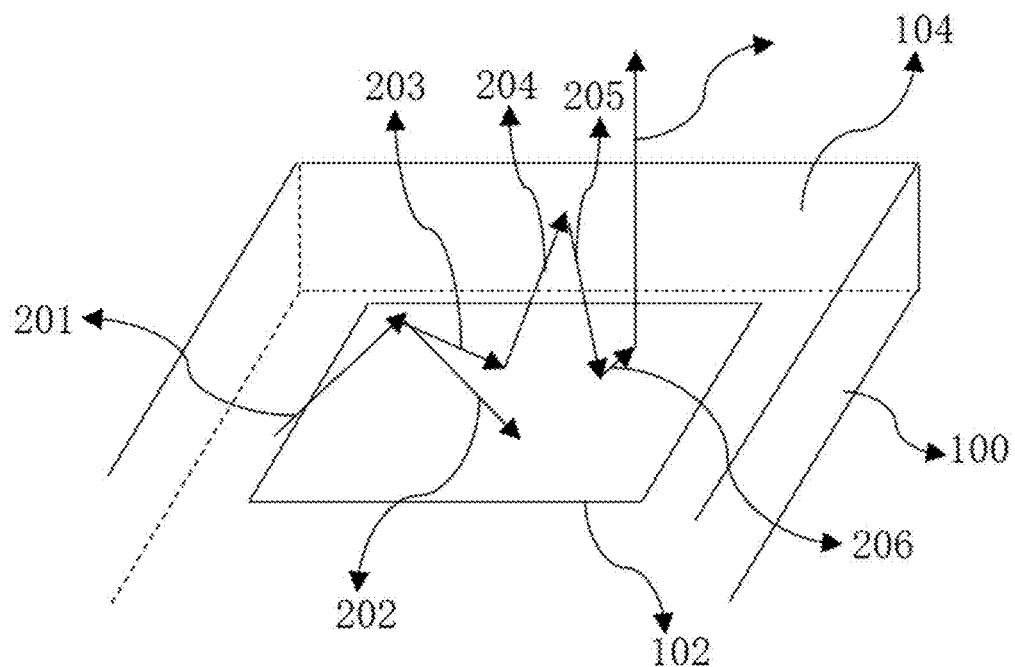
FIG. 2 is an optical path diagram of the light guide device according to an embodiment of the present application.

According to an embodiment of the present application, a light guide device is provided. Referring to FIG. 1 and FIG. 2, the light guide device includes a substrate 100, a coupling-out pupil expansion region 102 and a reflection layer. The substrate 100 includes two opposite surfaces and a sidewall connected between the two surfaces. The coupling-out pupil expansion region 102 is provided on the surface. The reflection interface 104 of the reflection layer is towards the interior of the substrate 100 and is located on the diffraction path of the coupling-out pupil expansion region 102. The coupling-out pupil expansion region 102 is configured to perform multiple diffraction light splits on the coupling-in light 201 coupled into the substrate 100, and the reflection interface 104 is cooperated with the coupling-out pupil expansion region 102, so as to reflect the light after multiple diffraction light splits through the coupling-out pupil expansion region 102 and perform coupling-out imaging through the coupling-out pupil expansion region 102.

According to the light guide device provided in the embodiment of the present application, the reflection layer is cooperated with the coupling-out pupil expansion region 102, and the reflection interface 104 of the reflection layer is located on the diffraction path of the coupling-out pupil expansion region 102, so that the light propagation path inside the light guide device is optimized, and the light coupled into the light guide device is not emitted when encountering the coupling-out pupil expansion region, but is emitted to the reflection interface 104 after being split by the diffraction of the coupling-out pupil expansion region for many times. The light reflected by the reflection interface 104 is re-imaged through the coupling-out pupil expansion region 102, which forms a light transmission path for imaging, and does not produce "ghost images" compared with the two light transmission paths in the related art. At the same time, the utilization rate of the light is improved, thereby improving the light transmission efficiency of the light guide device. In addition, the light guide device also has the advantages such as the simple structure, the convenient production and the low cost, and has a broad application prospect.

According to the light guide device provided in the embodiment of the present application, the light used for imaging is reflected by the reflection layer to be in a backhaul to the coupling-out pupil expansion region 102, and is coupling-out imaged. Compared with the backhaul grating, the reflection layer can directly reflect the light, which can achieve the effect of high-efficiency light backhaul without affecting the pupil expansion, and can improve the overall optical efficiency performance of the new architecture.

The light guide device provided in the embodiment of the present application is provided with a reflection layer at the periphery of the coupling-out pupil expansion region 102. The reflection layer plays a crucial role, and the main function of which is to cooperate with the coupling-out pupil expansion region 102. The cooperation can achieve a two-dimensional pupil expansion effect. Finally, the coupled-out light through the coupling-out pupil expansion region 102 can cover the observation position of the human's eyes.

Specifically, the reflection layer enables the light after multiple diffraction light splits through the coupling-out pupil expansion region 102 to be reflected and coupling-out imaged after re-passing through the coupling-out pupil expansion region 102. That is, all the light coupled into the substrate 100 can propagate to the coupling-out pupil expansion region 102 along the same propagation path. This design helps to optimize the propagation path of the imaging light, reduce the light loss and solve the problem of "ghost images", thereby improving the imaging quality.

It should be noted that, in the light guide device provided in the embodiment of the present application, due to the presence of the reflection interface 104, the light will be reflected and smoothly propagate to the coupling-out pupil expansion region 102 after the total reflection through the substrate 100. This reflection and the total reflection propagation process will continue until the coupling-out pupil expansion region 102 is covered by the light.

The light guide device provided in the embodiment of the present application can optimize the light propagation path. Specifically, through the arrangement of the reflection layer, the light guide device can effectively control and guide the light entering the interior of the substrate 100 and propagating to the coupling-out pupil expansion region 102. The reflection interface 104 of the reflection layer is towards the interior of the substrate 100 and is located on the diffraction light split path of the coupling-out pupil expansion region 102, which ensures that the light after the diffraction light split through the coupling-out pupil expansion region 102 can be reflected by the reflection interface 104, and can continue to propagate towards the coupling-out pupil expansion region 102.

Through the technical solution provided in the embodiment of the present application, referring to FIG. 1 and FIG. 2, almost all the light coupled into the substrate 100 of the light guide device can propagate to the coupling-out pupil expansion region 102. On the coupling-out pupil expansion region 102, the light realizes pupil expansion coupling-out through a specific optical structure (such as a diffraction optical element), which can satisfy the visual experience of the user.

The light guide device provided in the embodiment of the present application can improve the imaging quality. Specifically, by reasonably arranging the reflection layer and the coupling-out pupil expansion region 102, the light guide device can realize precise control to the light propagating inside the substrate 100, which can reduce the light loss, thereby improving the clarity and contrast of imaging. This is particularly important for applications that require high-quality imaging (such as augmented reality, virtual reality, etc.).

The light guide device provided in the embodiment of the present application can enhance the utilization rate of the light. Specifically, through the cooperation of the reflection layer, the light guide device can guide more light to the coupling-out pupil expansion region 102 for coupling-out, thereby improving the utilization rate of light. This helps to reduce energy consumption and extend the service life of the device.

The light guide device provided in the embodiment of the present application helps to expand the field of view angle. Specifically, through multiple diffraction light splits, the light can cover a wider area when propagating in the substrate 100, thereby expanding the field of view angle of the light guide device.

In summary, the light guide device achieves effective control, guidance and coupling-out of the light propagating in the substrate 100 and expands the field of view through the design and cooperation of the reflection layer, which improves the imaging quality and utilization rate of the light, and provides users with a better visual experience.

According to the light guide device provided by the embodiment of the present application, referring to FIG. 1 and FIG. 2, the optical propagation path of the light is as follows:

The coupling-in light 201 coupled into the substrate 100 propagates through a total reflection and generates a first light 202 and a second light 203 by the diffraction light split after encountering the coupling-out pupil expansion region 102. The first light 202 has the same K vector as the coupling-in light 201, the second light 203 generates a third light 204 propagating towards the reflection interface 104 after the total reflection, the third light 204 is reflected by the reflection interface 104 and generates a fourth light 205, the fourth light 205 generates a fifth light 206 after the total reflection, and the fifth light 206 is coupled out after encountering the coupling-out pupil expansion region 102. The first light 202 propagates along the propagation direction of the coupling-in light 201 and is diffracted after encountering the coupling-out pupil expansion region 102, and repeats the propagation path of the second light 203 and is finally coupled out through the coupling-out pupil expansion region 102.

Referring to FIG. 2, the coupling-in light 201 entering the substrate 100 propagates through the total reflection, and a diffraction light split phenomenon occurs when encountering the coupling-out pupil expansion region 102. This design allows fine management and control of the light, so as to meet specific optical requirements.

Specifically, after the coupling-in light 201 encounters the coupling-out pupil expansion region 102, the first light 202 generated after the diffraction light split has the same K vector as the coupling-in light 201, which means that the first light 202 has the same propagation direction as the coupling-in light 201, that is, the first light 202 is a 0-level diffraction light. The second light 203 is cooperated with the reflection of the reflection interface 104 through the total reflection of the substrate 100, and generates the third light 204 that propagates towards different directions. The second light 203 is a turning light. The diversity and flexibility of this light enable the light guide device to adapt to more complex optical environments and application requirements. The third light 204 generates the fourth light 205 after being reflected by the reflection interface 104, and generates the fifth light 206 again through the total reflection. In the above process, the light is split, reflected, and totally reflected for many times inside the substrate 100, so that more light can be used and the uniform distribution of light is improved. Moreover, the final coupling-out light can be made more uniform, thereby improving the quality and brightness of imaging.

After the first light 202 encounters the coupling-out pupil expansion region 102 again, it does not emit light first, but repeats the propagation path of the second light 203, which further enhances the pupil expansion effect of the light, so that the light can be more evenly spread over the coupling-out pupil expansion region 102, thereby improving the imaging quality and brightness of the entire light guide device.

The light guide device provided by the embodiment of the present application can effectively manage the light and reduce the light loss. Specifically, the reflection interface 104 enables light to be effectively reflected and utilized, thereby improving the utilization rate of light and reducing the light loss. At the same time, by controlling the propagation path and the diffusion effect of the light, the distortion of light can also be reduced and the clarity of imaging can be improved.

The first light 202 is a 0-level diffraction light, which is consistent with the K vector of the coupling-in light 201. In grating diffraction, the K vector represents the propagation direction of light, including the incident direction and diffraction direction of light. The 0-level diffraction light means that after light passes through a diffraction optical element such as a grating, its diffraction angle is the same as the incident angle, and the light is basically propagated in the original direction, that is, the light is not deflected. In this case, the K vectors of the 0-level diffraction light and the incident light are consistent, because in 0-level diffraction, the light does not change direction due to the periodic structure of the grating. Therefore, the propagation direction of the incident light and the 0-level diffraction light, that is, their K vectors are the same or substantially the same.

The direction of the second light 203 is different from that of the first light 202.

In an embodiment of the present application, the light spreading and homogenization can be achieved through the cooperation of the reflection layer and the coupling-out pupil expansion region 102. Specifically, the fifth light 206 propagates to the coupling-out pupil expansion region 102 to be the coupling-out light 207. At the same time, the first light 202 also repeats the propagation path of the second light 203 until the light can cover the entire coupling-out pupil expansion region 102. This light spreading and homogenization process helps to expand the range that can be viewed by the human's eyes, thereby improving the visual experience of the user.

In an embodiment of the present application, a one-dimensional grating or a two-dimensional grating is provided in the coupling-out pupil expansion region 102.

In an embodiment of the present application, the one-dimensional grating is provided in the coupling-out pupil expansion region 102. In view of this, the light guide device provided in the embodiment of the present application can achieve the pupil expansion effect at the position of the coupling-out light through the one-dimensional grating and the reflection layer. Finally, the coupling-out light through the coupling-out pupil expansion region 102 can cover the observation position of the human's eyes.

The one-dimensional grating is also called linear grating, and its main characteristic is that it has a one-dimensional periodic structure, which has a large number of parallel scribed lines or slits in one direction. The manufacture of the one-dimensional grating is relatively simple, and a large number of parallel scribed lines can be scribed on glass or metal sheets using a precision scriber.

The one-dimensional grating can be adopted in the embodiment of the present application, so that the processing difficulty and production cost of the light guide device can be reduced. In addition, the one-dimensional grating can efficiently diffract the light and decompose the incident light into different wavelength components, which is the main advantage as a dispersion element.

Of course, the coupling-out pupil expansion region 102 may also be a two-dimensional grating, which can be selected according to needs, and is not limited in the embodiment of the present application.

The two-dimensional grating, also known as a planar grating or a holographic grating, has a periodic structure in both directions.

One advantage of the two-dimensional grating is high spectrum resolution. Specifically, the two-dimensional grating can provide higher spectrum resolution, which has scribed lines in both directions, and can analyze spectrum components more finely.

In an embodiment of the present application, referring to FIG. 1, the light guide device includes a coupling-in region 101. The coupling-in region 101 and the coupling-out pupil expansion region 102 are provided on at least one surface of the substrate 100. The coupling-in region 101 is configured to couple the light emitted by the external light source into the substrate 100 and to the coupling-out pupil expansion region 102. The coupling-in region 101 is provided with a diffraction optical element, and the reflection interface 104 is perpendicular to the interface of the diffraction optical element.

The coupling-in region 101 is provided on one surface of the substrate 100. The coupling-in region 101 is configured to couple an external light source, such as the incident light projected by an optical machine, into the interior of the substrate 100 to form the coupling-in light 201. Referring to FIG. 2, it is ensured that the light can quickly and effectively enter the interior of the substrate 100 of the light guide device, and provide a stable light source for the subsequent total reflection propagation and the pupil expansion coupling-out.

The coupling-in region 101 and the coupling-out pupil expansion region 102 can be provided on the same surface of the substrate 100, referring to the upper surface shown in FIG. 2. Of course, the coupling-in region 101 and the coupling-out pupil expansion region 102 can also be provided separately on the two surfaces of the substrate 100.

The diffraction optical element is provided in the coupling-in region 101. The incident light can be coupled into the substrate 100 of the light guide device after diffraction through the diffraction optical element. The diffraction optical element can further regulate the diffraction behavior of the incident light, and can accurately control the diffraction angle and the distribution of the incident light, thereby optimizing the propagation path of the light in the substrate 100.

According to the above embodiments, the reflection interface 104 is perpendicular to the interface of the diffraction optical element, which facilitates the reflection and reuse of the light in the substrate 100. When the light propagates in the substrate 100 and encounters the reflection interface 104, the light can be reflected with higher efficiency due to the perpendicular interface, thereby optimizing the propagation path and the diffusion effect of the light in the substrate 100.

It should be noted that the interface between the reflection interface 104 and the diffraction optical element should be perpendicular, but there may be a small amount of error.

By optimizing the design of the coupling-in region 101, including the introduction of the diffraction optical element and the vertical configuration with the reflection interface 104, the overall performance of the light guide device is significantly improved. This is not only reflected in the coupling-out efficiency of the light in the coupling-out pupil expansion region 102, but also in the propagation stability and the imaging quality of the light inside the substrate 100.

In an embodiment of the present application, the coupling-in region 101 is provided with a one-dimensional grating, and the normal direction of the reflection interface 104 is perpendicular to the grating vector direction of the one-dimensional grating.

When the coupling-in region 101 is provided with the one-dimensional grating, and the normal direction of the reflection interface 104 is perpendicular to the grating vector direction of the one-dimensional grating, which brings about significant technical effects as follows:

Firstly, the one-dimensional grating enables the light to be coupled into the substrate 100 in a specific direction and angle. Since the grating vector direction determines the diffraction direction and the propagation path of the light, it is ensured that the light can efficiently enter the waveguide and propagate along the predetermined path, which helps to improve the utilization rate and the imaging quality of the light.

Secondly, the normal direction of the reflection interface 104 is perpendicular to the grating vector direction of the one-dimensional grating, which indicates that the reflection interface 104 can effectively reflect the light after multiple diffraction splits in the coupling-out pupil expansion region 102. Since the normal direction of the reflection interface 104 is perpendicular to the vector direction of the one-dimensional grating of the coupling-in region, the reflection interface 104 can reflect the light back to the coupling-out pupil expansion region 102 at a suitable angle, so that the light can be coupled out to be imaged again. This reflection mechanism ensures the effective use of the light and avoids the waste of the light energy.

In addition, due to the perpendicular relationship between the reflection interface 104 and the grating vector direction of the one-dimensional grating in the coupling-in region 101, the light is not easily scattered or deviated from the predetermined path during the reflection process. This can help maintain the clarity and consistency of the light, reduce the occurrence of ghost images or blurring, and improve the clarity and quality of the image.

That is, when the coupling-in region 101 is provided with the one-dimensional grating, and the normal direction of the reflection interface 104 is perpendicular to the grating vector direction of the one-dimensional grating, this design can efficiently couple and reflect the light, improve the utilization rate of the light energy and the imaging quality, while reducing the generation of the stray light and improving the user's visual experience.

It should be noted that the coupling-in region 101 is not limited to the use of the one-dimensional grating, and the two-dimensional grating can also be used.

In an embodiment of the present application, the coupling-in region 101 is provided with the two-dimensional grating, the normal direction of the reflection interface 104 is perpendicular to a vector direction of the two-dimensional grating, and the vector direction of the two-dimensional grating is a primary diffraction direction when the light emitted by the external light source is normally incident.

That is, the two-dimensional grating can also be used in the coupling-in region 101. The two-dimensional grating has the optical performance of generating diffraction in two directions at the same time. When the incident light emitted by the external light source is incident on the two-dimensional grating in the coupling-in region 101, a more efficient diffraction effect can be generated. This enables the incident light to be coupled into the substrate 100 more quickly, thereby improving the utilization rate of the light.

When the coupling-in region 101 is provided with the two-dimensional grating, the normal direction of the reflection interface 104 is perpendicular to the vector direction of the two-dimensional grating, and the vector direction is the primary diffraction direction of the light emitted by the external light source when it is incident, the following technical effects are achieved:

Firstly, the two-dimensional grating enables the light to be coupled into the substrate in a more complex and precise manner. Compared with the one-dimensional grating, the two-dimensional grating has more diffraction directions and control parameters, and can adjust the propagation path and the distribution of the light more flexibly. This enables the light to be more evenly distributed throughout the light guide device, improving the utilization rate of the light energy and the imaging uniformity.

Secondly, the normal direction of the reflection interface 104 is perpendicular to the vector direction of the two-dimensional grating, ensuring that the reflection interface 104 can effectively reflect the light after multiple diffraction splits in the coupling-out pupil expansion region. Since the vector direction is the primary diffraction direction when the external light source is normally incident, the reflection interface 104 can receive and reflect the light at the best angle, so that they can be coupled out to be imaged again. This further improves the utilization rate of the light recovery and reduces the loss of the light energy.

In addition, since the two-dimensional grating has more diffraction directions and control capabilities, it can also better manage the dispersion problem of the light. By accurately designing the structure and parameters of the two-dimensional grating, the dispersion of light can be effectively controlled, so that light of different wavelengths can maintain a relatively consistent propagation path and the imaging effect. This helps to reduce the color distortion and blurring of the image and improve the clarity and color reproduction of the image.

In summary, the two-dimensional grating is as the coupling-in region 101, combining with the vertical relationship between the reflection interface 104 and the two-dimensional grating vector direction, realizes the efficient coupling and reflection of the light. The utilization rate of the light energy and the imaging quality can be improved, while optimizing the dispersion management, and improving the image clarity and the color performance. Thus, a more realistic and vivid visual experience can be brought to users.

In an embodiment of the present application, the reflection layer is a metal coating.

There are many specific implementation methods of the reflection layer. For example, the reflection layer can be a coating made of a material with reflective properties.

The metal coating has high reflectivity, especially in the visible light band. In this way, most of the light can be effectively reflected to the inside of the substrate 100 and propagate to the coupling-out pupil expansion region 102, reducing the light energy loss and improving the utilization rate of the light energy.

The metal coating has good optical properties such as low scattering rate, which enables light to maintain high directivity and concentration when passing through the reflection layer, reducing light scattering and distortion.

The metal coating has high stability and durability, and can resist the influence of environmental factors such as oxidation and corrosion. Thus the light guide device has long service life and stable performance.

The surface treatment of the metal coating is crucial to improve the reflection effect and stability. The surface treatment method includes polishing, etching and coating with a protective layer. These treatment methods can reduce surface roughness, improve reflectivity and enhance the durability of the coating.

In an embodiment of the present application, the material of the reflection layer includes at least one of silver, aluminum and copper.

When the reflection layer is a metal coating, the material of the metal coating includes silver, aluminum, copper and other materials that can achieve high reflection efficiency. Different metal coating materials can be selected according to the specific application scenarios and performance requirements of the light guide device.

Figure 4:
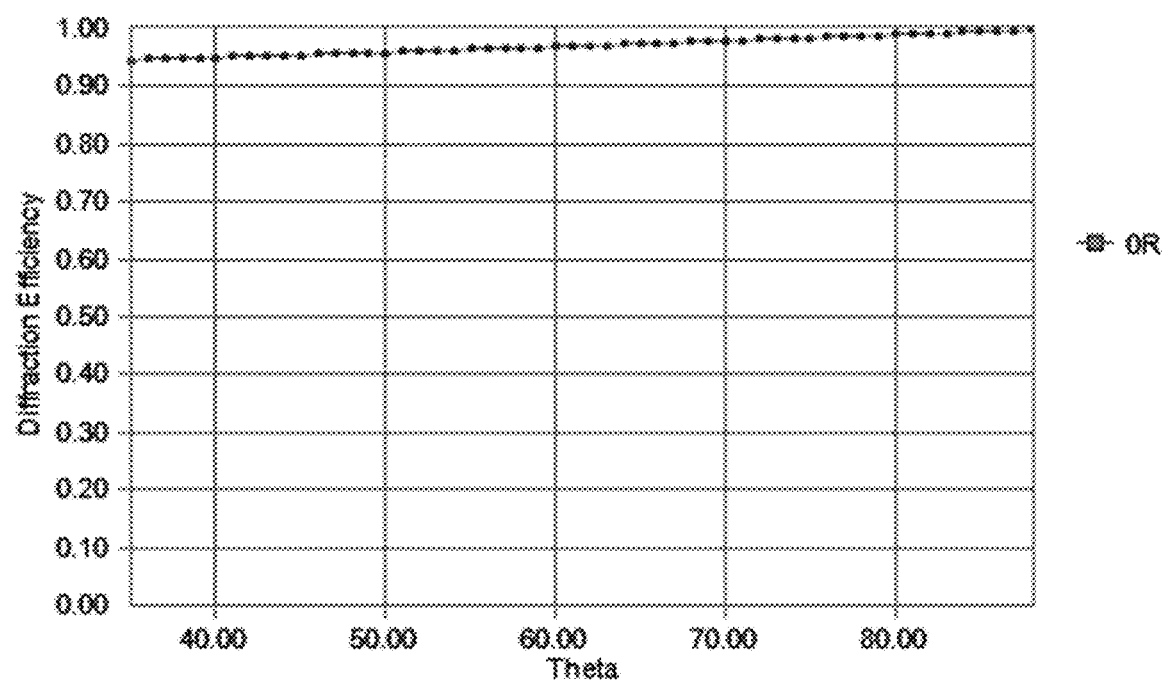
FIG. 4 is a light backhaul efficiency curve of a reflection layer of the light guide device according to an embodiment of the present application.

For example, the aluminum coating has high reflectivity and low cost. The silver coating has higher reflection performance but the cost is also correspondingly higher, which is suitable for applications with extremely strict requirements on optical performance. Referring to FIG. 4, the silver coating can achieve an average reflection efficiency of more than 95%, which is much higher than the backhaul grating.

In an embodiment of the present application, the roughness of the reflection interface 104 of the reflection layer is less than 10 nm.

The roughness of the reflection interface 104 is designed to be smaller, generally less than 1 um.

According to the above embodiments, since the light can maintain a high directivity and concentration after reflection when the roughness of the reflection interface 104 is less than 10 nm, the light is less likely to be scattered during reflection, which reduces energy loss, and improves the utilization rate of the light energy.

In the above embodiments of the present application, the roughness of the reflection interface 104 is designed to be smaller, such as less than 10 nm, which can improve the reflection efficiency. Specifically, the fine reflection interface can ensure that the light follows the law of reflection during reflection, reduce the energy loss, and improve the reflection efficiency. This helps to maintain the efficient propagation of the light inside the light guide device.

In addition, the roughness of the reflection interface 104 is designed to be smaller, which helps to improve the imaging quality. Specifically, a smaller roughness means that the reflection interface will be smoother, which helps to reduce the distortion of the light during reflection. Therefore, the imaging quality is significantly improved, and the user can observe clearer and sharper images.

In addition, the roughness of the reflection interface 104 is designed to be smaller, which also helps to enhance the field of view angle. Specifically, the fine reflection interface helps to accurately reflect light to the expected direction, thereby expanding the field of view angle. This means that the user can observe clear images in a wider angle range, improving the user's experience.

In an embodiment of the present application, the reflection layer is a diffraction optical element or a super surface device. The diffraction optical element includes a photonic crystal.

The diffraction optical element (DOE) controls the propagation path of light through the diffraction behavior of light, which are usually composed of periodic or non-periodic microstructures that can diffract, focus, deflect or shape light within a specific wavelength range.

The photonic crystal is a medium with periodic refractive index changes, similar to the atomic arrangement in the crystal. The photonic crystals can affect the propagation behavior of light, including the band gap and waveguide properties of photons. In the diffraction optical element, photonic crystals can be used as the basic unit of microstructures to achieve specific optical functions by regulating the periodicity and refractive index changes of crystals.

The super surface device is a two-dimensional nanostructure array that can control the phase, amplitude and polarization state of light waves on a subwavelength scale. By precisely designing the size, shape and arrangement of each nanostructure, the super surface device can achieve efficient light wave manipulation, such as abnormal reflection, transmission and focusing.

Figure 7:
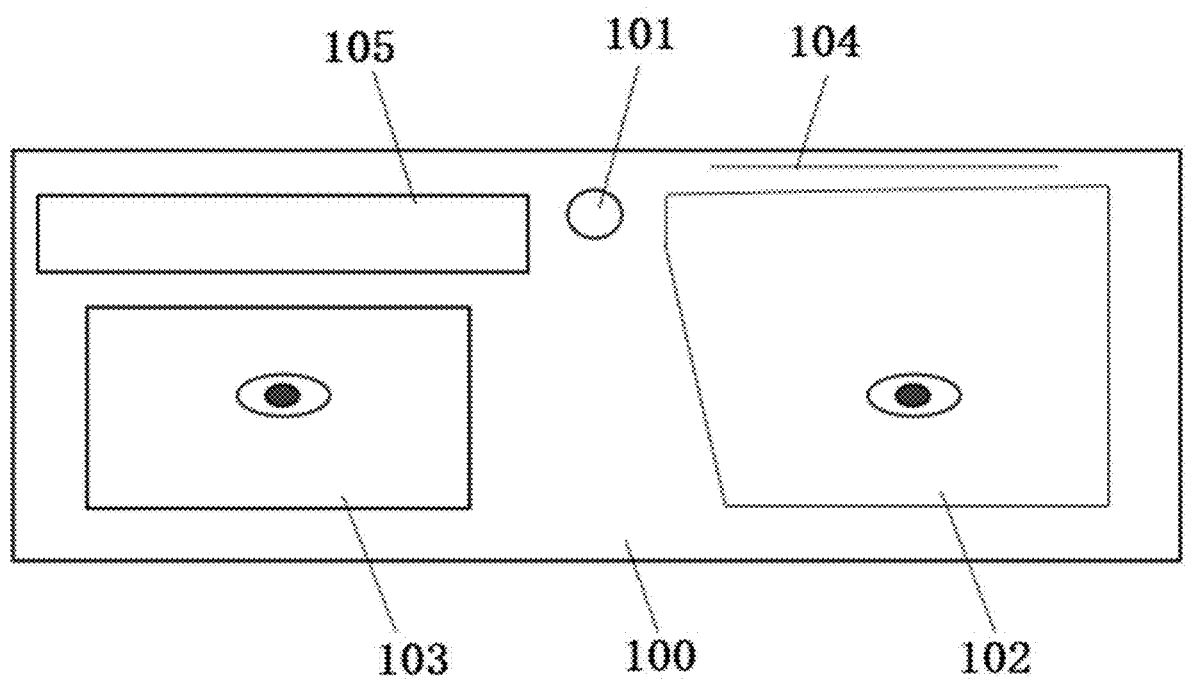
FIG. 7 is a top view of the light guide device according to an embodiment of the present application.

In an embodiment of the present application, referring to FIG. 7, the light guide device further includes a coupling-out region 103. The coupling-out pupil expansion region 102 and the coupling-out region 103 are provided on both sides of the coupling-in region 101, and the coupling-in light 201 coupled into the substrate 100 through the coupling-in region 101 is split to the two sides and coupled-out to the left and right eyes of the user through the coupling-out pupil expansion region 102 and the coupling-out region 103 respectively.

That is, the light guide device is a middle incident light source, and the light on both sides is split and incident on the left and right eyes respectively. The advantage of this design is that the cost is low, and the binocular incidence is completed with only one waveguide.

Referring to FIG. 7, the coupling-out region 103 is used on the left side, and the coupling-out pupil expansion region 102 is used on the right side to match the new pupil expansion frame design of the reflection layer. After coupled into the interior of the substrate 100 through the coupling-in region 101, the light is totally reflected to propagate. On the left side, the light propagates to the coupling-out region 103 according to the normal optical propagation path; and on the right side, the pupil expansion diffraction occurs to the reflection layer. After being reflected by the reflection interface 104 of the reflection layer, the light can propagate to the coupling-out pupil expansion region 102 for coupling-out.

In an embodiment of the present application, the coupling-in light 201 coupled into the substrate 100 is two half fields of view light, and the two half fields of view light propagate to the coupling-out pupil expansion region 102 and the coupling-out region 103 respectively. The coupling-out region 103 is used to restore the half field of view light, and the coupling-out pupil expansion region 102 flips the propagated half field of view light based on the flipping characteristics reflected by the reflection interface 104 to restore it to the other half field of view light. The restored two half fields of view light are spliced to form a target image.

Figure 3:
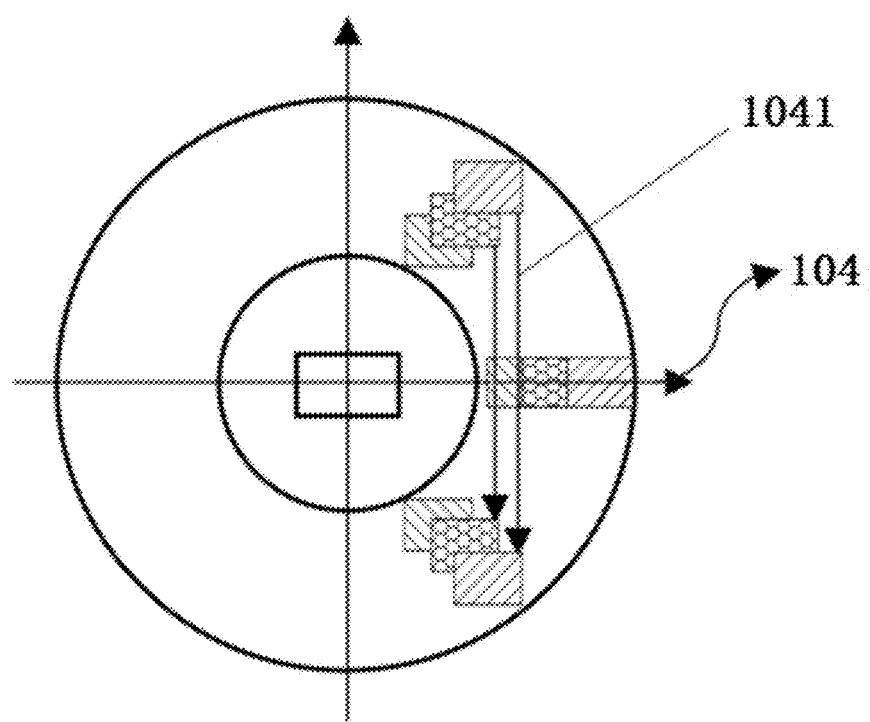
FIG. 3 is a K-space distribution diagram of a reflection interface of the light guide device according to an embodiment of the present application.

In the embodiment of the present application, the reflection layer is provided at the periphery of the coupling-out pupil expansion region 102. Compared with the backhaul grating, the reflection layer can effectively improve the backhaul efficiency. Referring to FIG. 3, the propagation logic of the corresponding K space FOV will change, that is, the normal axis of the reflection interface is used to replace the diffraction axis of the backhaul grating. The final image is an upside-down image, which is symmetrical about the direction of the reflection interface 104. Specifically, referring to the normal direction of the reflection interface 1041 shown in FIG. 3, due to the characteristics of reflection, the FOV will be symmetrical about the direction of the reflection interface 104 after reflection. As shown in FIG. 3, the FOV is flipped upside down after the reflection.

Figure 9:
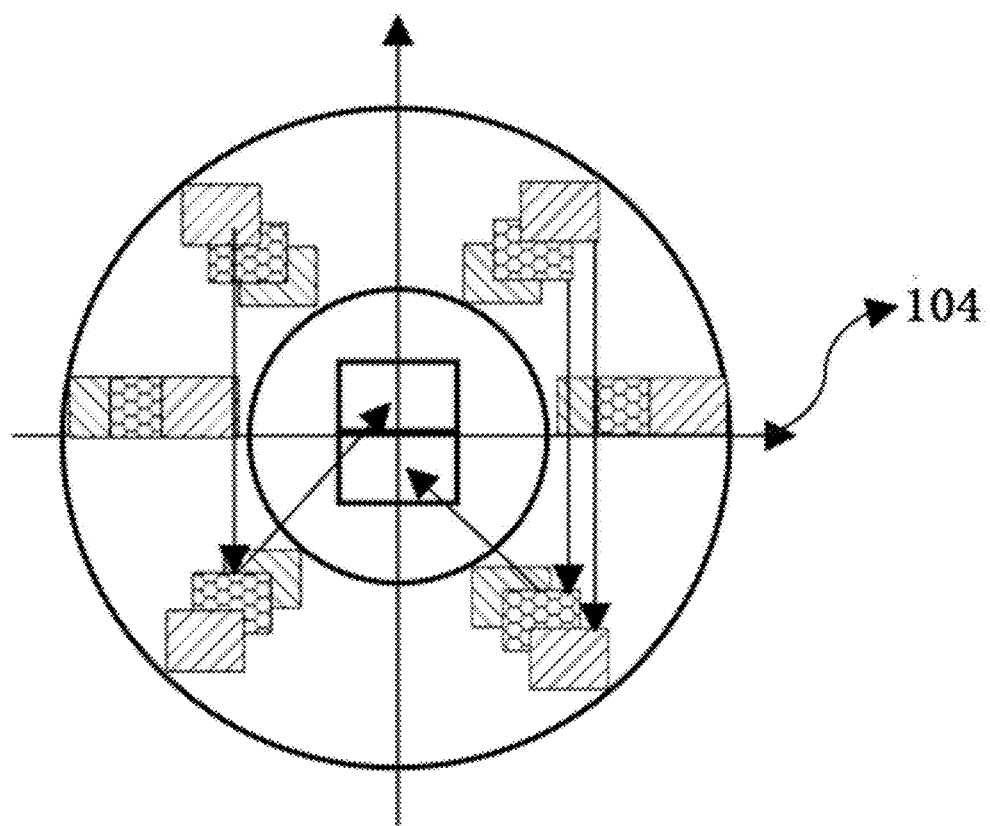
FIG. 9 is a K-space distribution diagram of the light guide device according to an embodiment of the present application.

Referring to FIG. 9, the K-map of the grating structure of the coupling-out region 103 corresponding to the left eye, the coupling-out pupil expansion region 102 corresponding to the right eye, and the reflection layer can be provided as follows: the upper field of view light or the lower field of view light is input, assuming that the left eye will still restore the upper FOV according to the normal propagation path when the upper field of view light is input, while the new structure of the right eye will become the lower FOV when restored due to the flipping characteristics of the reflection, thereby splicing into a larger FOV. In other words, the light guide device can double the FOV without changing the refractive index of the substrate.

In an embodiment of the present application, the pupil expansion region 105 is provided on the first surface, the pupil expansion region 105 is provided on one of the surfaces of the substrate 100, and the pupil expansion region 105 is located on a path from the coupling-in region 101 to the coupling-out region 103 to propagate light.

Adding the pupil expansion region 105 between the coupling-in region 101 and the second coupling-out region 103 can achieve the following effects in the light guide device:

Firstly, the pupil expansion effect, which helps to provide a wider field of view.

Secondly, the pupil expansion region 105 can gradually diffuse and homogenize the light during the propagation process, which helps to reduce the non-uniformity of the light intensity and improve the uniformity of the emitted light, thereby improving the clarity and brightness of the image.

Thirdly, by reasonably designing the structure and parameters of the pupil expansion region 105, more light can still maintain high energy and directionality after passing through the pupil expansion region 105, which helps to reduce the light energy loss and improve the utilization rate of the light energy, so that the light guide device can produce brighter and more uniform emitted light under the same light source conditions.

Fourthly, the pupil expansion region 105 optimizes the propagation path of the light inside the light guide device, allowing the light to transition to the coupling-out region more smoothly, which helps to reduce the refraction and scattering of the light, improves the propagation efficiency of light, and improves the imaging quality and brightness of the guide device.

In summary, by adding the pupil expansion region 105 between the coupling-in region 101 and the coupling-out region 103, the field of view angle can be expanded, the light uniformity and the utilization rate of the light energy can be improved, and the light path can be optimized. These effects together improve the overall performance of the light guide device.

In an embodiment of the present application, the coupling-out region 103 is provided with a one-dimensional grating or a two-dimensional grating.

The second coupling-out region 103 may include a single one-dimensional grating or multiple one-dimensional or two-dimensional gratings, etc.

Figure 5:
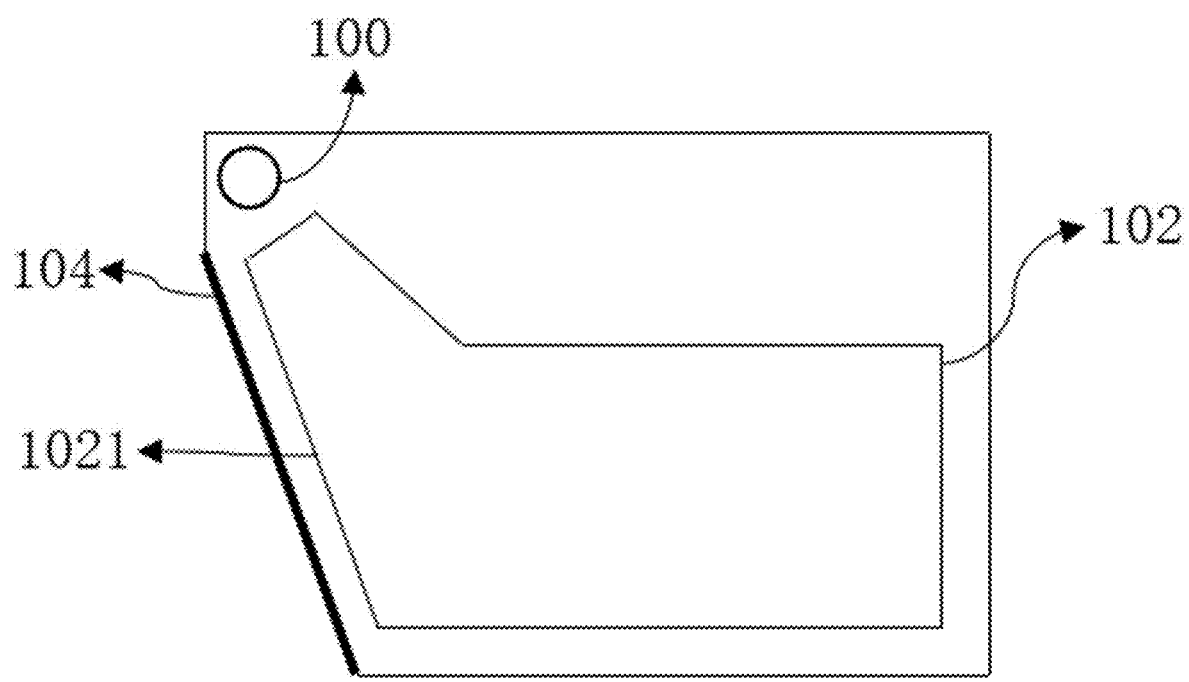
FIG. 5 is a top view of the light guide device according to an embodiment of the present application.

In an embodiment of the present application, referring to FIG. 5, the edge of the coupling-out pupil expansion region 102 is provided with an avoidance hypotenuse 1021. The projection of the reflection interface 104 on the surface where the coupling-out pupil expansion region 102 is provided is located at the periphery of the avoidance hypotenuse 1021 and is consistent with the inclination direction of the avoidance hypotenuse 1021.

Figure 6:
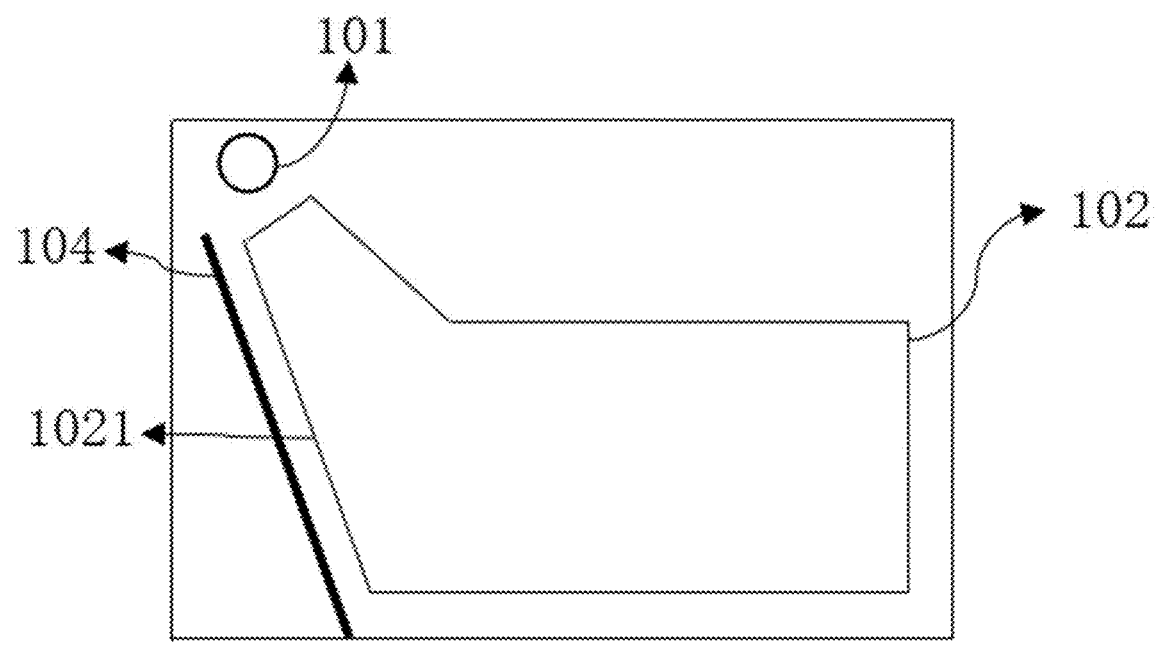
FIG. 6 is a top view of the light guide device according to an embodiment of the present application.

Referring to FIG. 5, the reflection layer can be provided on the sidewall of the substrate 100 of the light guide device, and can also be provided inside the substrate 100. Referring to FIG. 6, as long as the reflection interface of the reflection layer is towards the inside of the substrate and located on the diffraction light split path of the coupling-out pupil expansion region.

Specifically, referring to FIG. 6, the reflection layer can be provided inside the substrate 100 instead of on the sidewall of the substrate 100.

Referring to FIG. 5 and FIG. 6, the avoidance hypotenuse provided at the edge of the coupling-out pupil expansion region 102 is to avoid the nose bridge and brow bone of the user.

The projection of the reflection interface 104 is located at the periphery of the avoidance hypotenuse 1021 and is consistent with the inclination direction of the avoidance hypotenuse 1021, which enables the reflection interface 104 to better receive the light from the coupling-out pupil expansion region 102. Due to the cooperation of the inclination direction, the reflection interface 104 can receive the light at a more suitable angle and reflect it back to the coupling-out pupil expansion region 102, so that the light can be coupled out to be imaged again. This design helps to improve the utilization rate of light and the uniformity of imaging.

According to an embodiment of the present application, a light guide assembly is provided, and the light guide assembly includes an optical machine and the light guide device as described above.

The optical machine is the above external light source, which can emit light for imaging display.

Figure 8:
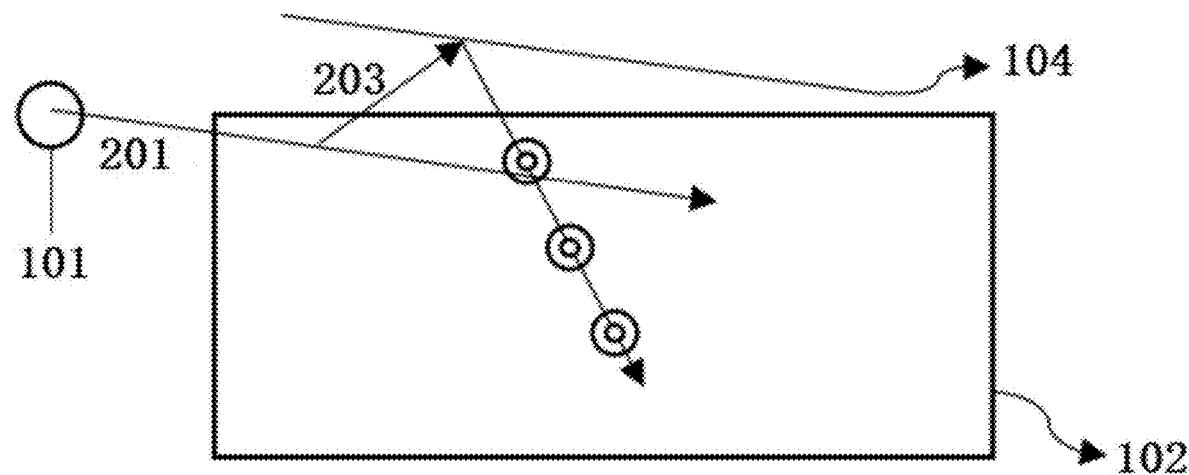
FIG. 8 is an optical path diagram of the light guide device according to an embodiment of the present application.

In an embodiment of the present application, referring to FIG. 8, when the projection of the reflection interface 104 on the surface where the coupling-out pupil expansion region 102 is located forms an angle A with the horizontal field of view or the vertical field of view, the optical machine is made to rotate around its own optical axis to a target angle, and the target angle is 2A.

In the light guide device provided in the embodiment of the present application, a new two-dimensional pupil expansion architecture is formed by the coupling-out pupil expansion region 102 and the reflection layer, the direction of the incident FOV of which is related to the direction of the reflection interface 104, and the emitted FOV will flip along the direction of the reflection interface 104.

Specifically, when the direction of the reflection interface 104 is horizontal or vertical to the direction of the incident FOV, the FOV will flip horizontally or vertically, and the situation of other interface directions will be more complicated. Therefore, it is necessary to adjust the incident direction of the optical machine so that the FOV is in the normal emitted direction.

In the embodiment of the present application, the reflection layer is designed to assist the one-dimensional grating (the coupling-out pupil expansion region 102) to achieve the pupil expansion effect. Referring to FIG. 1, when the light is continuously split by the one-dimensional grating and reflected, it re-enters the one-dimensional grating and is coupled out for imaging.

Referring to FIG. 3, the FOV is flipped about the direction of the reflection interface 104 to move from the top to the bottom (the ordinary grating is through a translation), so that the final emission direction of the FOV is upside down.

Figure 10:
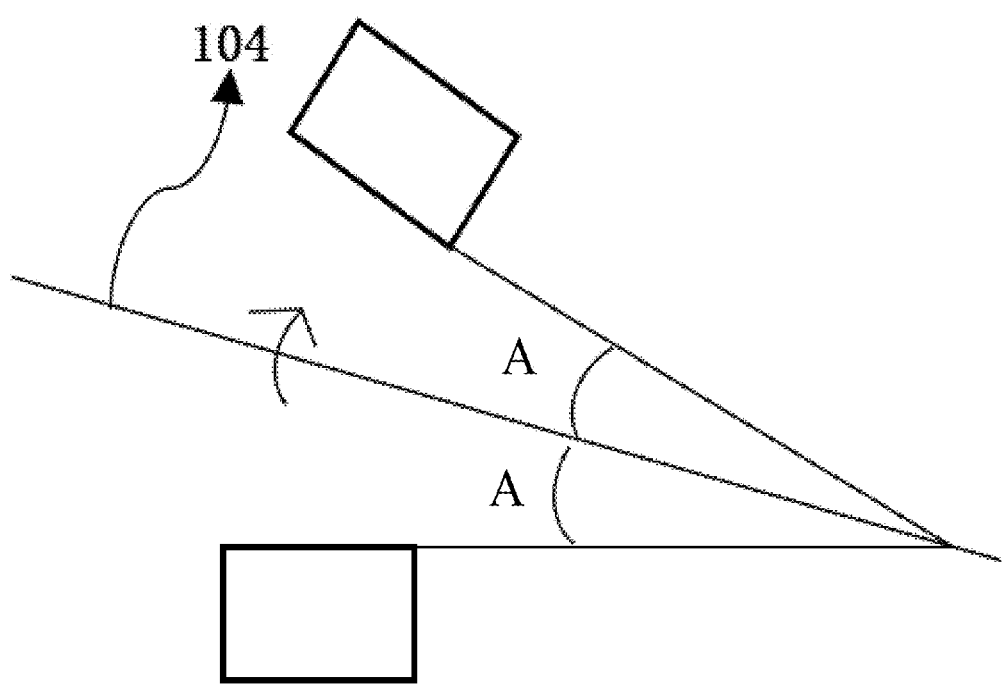
FIG. 10 is a schematic diagram of an angle formed by the reflection interface of the light guide device and a set direction according to an embodiment of the present application.
Figure 11:
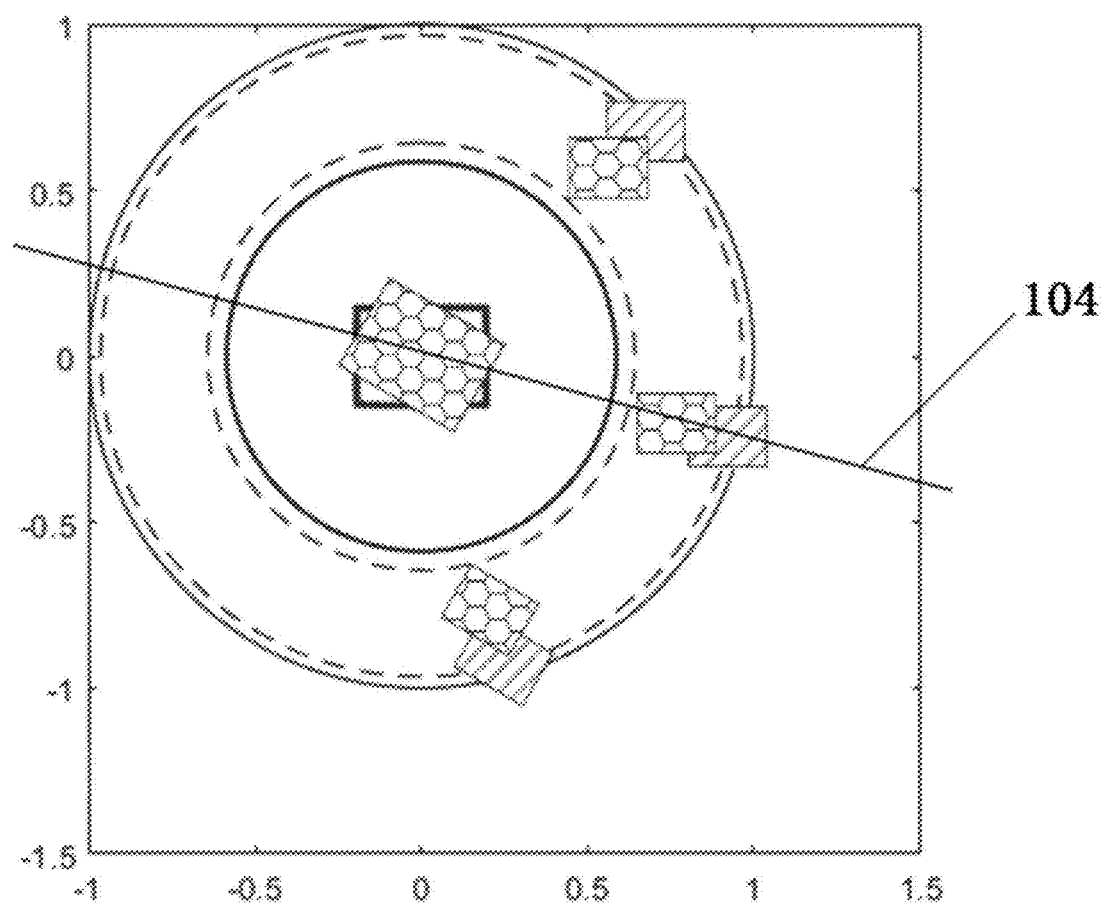
FIG. 11 is a K-space distribution diagram of the light guide device according to an embodiment of the present application.

It should be noted that for more complex flipping situations, referring to FIG. 10, the grating vector of the coupling-in region 101 and the direction of the reflection interface 104 have a rotation angle A compared with the horizontal direction of the FOV. The corresponding K diagram is shown in FIG. 11. The black frame in FIG. 11 is the FOV with horizontal and vertical incidence. After the direction of the reflection interface 104 is flipped and emitted, it is equivalent to a rotation of 2A times. It can be seen that the honeycomb-shaped square box is rotated by 2A times.

Figure 12:
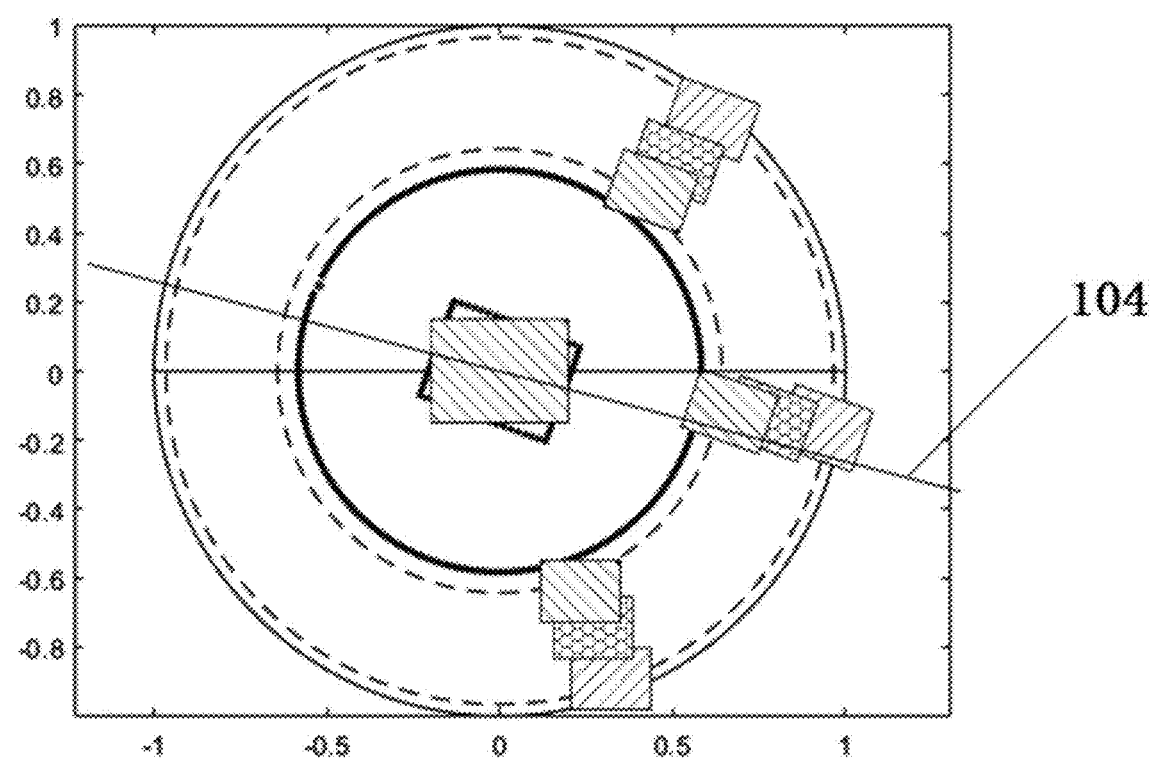
FIG. 12 is a K-space distribution diagram of the light guide device according to an embodiment of the present application.

In order to ensure that the FOV is emitted horizontally, the optical machine is designed to rotate 2A times around its own main optical axis when it is incident into the FOV. The K diagram is shown in FIG. 12. The black frame in FIG. 12 is the FOV with the angle of 2A times. After the direction of the reflection interface 104 is flipped and emitted horizontally, it can be seen that the square box with the beveled planing line has no angle rotation.

According to an embodiment of the present application, a display equipment is provided. The display equipment includes a housing and the light guide assembly as described above, and the light guide assembly is provided at the housing.

It should be noted that the display equipment provided in the embodiment of the present application is, for example, a head-mounted display equipment.

Further, the head-mounted display equipment is, for example, a pair of smart glasses or a smart helmet.

The specific implementation of the light guide assembly and the display equipment in the embodiment of the present application can refer to the embodiments of the light guide device, so that at least all the beneficial effects brought by the technical solutions of the above-mentioned embodiments are obtained, which will not be described here.

The above embodiments focus on the differences between the various embodiments. As long as the different optimization features between the various embodiments are not contradictory, they can be combined to form a better embodiment. Considering the simplicity of the text, they will not be described here.

Although some specific embodiments of the present application have been described in detail through examples, those skilled in the art should understand that the above embodiments are only for illustration, not for limiting the scope of the present application. Those skilled in the art should understand that the above embodiments can be modified without departing from the scope and spirit of the present application. The scope of the present application is defined by the attached claims.

What is claimed is:

1. A light guide device, comprising:
a substrate comprising two opposite surfaces and a sidewall connected between the two surfaces;
a coupling-out pupil expansion region provided at one of the two opposite surfaces; and
a reflection layer, wherein a reflection interface of the reflection layer is towards an interior of the substrate and is provided on a diffraction light path of the coupling-out pupil expansion region;
wherein the coupling-out pupil expansion region is configured to perform multiple diffraction light splits to coupling-in light coupled into the substrate, and the reflection interface is cooperated with the coupling-out pupil expansion region to reflect the light after multiple diffraction light splits through the coupling-out pupil expansion region and reflect the light through the coupling-out pupil expansion region for coupling-out imaging;
a one-dimensional grating is provided in the coupling-out pupil expansion region;
the light guide device further comprises a coupling-out region;
the coupling-in light coupled into the substrate is two half field of view light propagating to the coupling-out pupil expansion region and the coupling-out region respectively; and
the coupling-out region is configured to restore the half field of view light, the coupling-out pupil expansion region is configured to flip the propagated half field of view light based on flipping characteristics of the reflection interface to restore to another half field of view light, and the restored two half fields of view light are spliced to form a target image.

2. The light guide device according to claim 1, further comprising a coupling-in region configured to couple light emitted by an external light source into the substrate and propagate to the coupling-out pupil expansion region, wherein the coupling-in region and the coupling-out pupil expansion region are provided on at least one surface of the substrate; and
the coupling-in region is provided with a diffraction optical element, and the reflection interface is perpendicular to an interface of the diffraction optical element.

3. The light guide device according to claim 2, wherein the coupling-in region is provided with the one-dimensional grating, and a normal direction of the reflection interface is perpendicular to a grating vector direction of the one-dimensional grating.

4. The light guide device according to claim 3, wherein the coupling-out pupil expansion region and the coupling-out region are respectively provided on both sides of the coupling-in region, and the coupling-in light coupled into the substrate through the coupling-in region is split to both sides and coupled-out to the left and right eyes of a user through the coupling-out pupil expansion region and the coupling-out region respectively.

5. The light guide device according to claim 2, wherein the coupling-in region is provided with a two-dimensional grating, a normal direction of the reflection interface is perpendicular to a vector direction of the two-dimensional grating, and the vector direction of the two-dimensional grating is a first-order diffraction direction in response to that the light emitted by the external light source is normally incident.

6. The light guide device according to claim 1, wherein the reflection layer is a metal coating.

7. The light guide device according to claim 1, wherein a material of the reflection layer is at least one of silver, aluminum and copper.

8. The light guide device according to claim 1, wherein a roughness of the reflection interface is less than 10 nm.

9. The light guide device according to claim 1, wherein the reflection layer is a diffraction optical element or a super surface device; and the diffraction optical element comprises a photonic crystal.

10. The light guide device according to claim 1, further comprising a pupil expansion region provided on the surface of the substrate, wherein the pupil expansion region is provided on a path of the coupling-in region propagating light to the coupling-out region.

11. The light guide device according to claim 1, wherein the coupling-out region is provided with the one-dimensional grating or the two-dimensional grating.

12. The light guide device according to claim 1, wherein an edge of the coupling-out pupil expansion region is provided with an avoidance hypotenuse, and a projection of the reflection interface on the surface where the coupling-out pupil expansion region is provided is located at a periphery of the avoidance hypotenuse and is consistent with an inclination direction of the avoidance hypotenuse.

13. A light guide assembly, comprising:
an optical machine; and
the light guide device according to claim 1.

14. The light guide assembly according to claim 13, wherein in response to that a projection of a reflection interface on a surface where the coupling-out pupil expansion region is provided forms an angle A with the horizontal field of view or the vertical field of view, the optical machine is configured to rotate around its optical axis to a target angle, and the target angle is 2A.

15. A display equipment, comprising:
a housing; and
the light guide assembly according to claim 13;
wherein the light guide assembly is provided at the housing.

* * * * *